(12) United States Patent
Ando

(10) Patent No.: US 10,840,846 B2
(45) Date of Patent: Nov. 17, 2020

(54) MOTOR CONTROL SYSTEM, METHOD FOR ACTIVATING MOTOR CONTROL SYSTEM, AND MOTOR CONTROL ASSISTANCE DEVICE

(71) Applicant: KABUSHIKI KAISHA YASKAWA DENKI, Kitakyushu-shi (JP)

(72) Inventor: Kunimasa Ando, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 207 days.

(21) Appl. No.: 15/844,867

(22) Filed: Dec. 18, 2017

(65) Prior Publication Data

US 2018/0175777 A1 Jun. 21, 2018

(30) Foreign Application Priority Data

Dec. 19, 2016 (JP) ................................. 2016-245764

(51) Int. Cl.
| | |
|---|---|
| *H02H 3/00* | (2006.01) |
| *H02P 27/08* | (2006.01) |
| *H02M 5/458* | (2006.01) |
| *H02M 1/32* | (2007.01) |
| *H02P 3/22* | (2006.01) |
| *H02H 5/04* | (2006.01) |
| *H01H 50/08* | (2006.01) |

(52) U.S. Cl.
CPC .............. *H02P 27/08* (2013.01); *H02M 1/32* (2013.01); *H02M 5/4585* (2013.01); *H02P 3/22* (2013.01); *H02P 2201/07* (2013.01)

(58) Field of Classification Search
CPC .............................. Y02T 10/645; B60L 50/16
See application file for complete search history.

(56) References Cited

U.S. PATENT DOCUMENTS

| 2006/0071618 A1* | 4/2006 | Yudahira ............... B60L 3/0023 |
| | | 318/12 |
| 2010/0141188 A1* | 6/2010 | Kakebayashi ............ H02P 3/18 |
| | | 318/400.3 |

(Continued)

FOREIGN PATENT DOCUMENTS

| JP | 62-53178 A | 3/1987 |
| JP | 7-154986 A | 6/1995 |

(Continued)

OTHER PUBLICATIONS

Office Action dated Nov. 13, 2018 in Japanese Patent Application No. 2016-245764, 7 pages (with unedited computer generated English translation).

*Primary Examiner* — Jorge L Carrasquillo
*Assistant Examiner* — Charles S Laughlin
(74) *Attorney, Agent, or Firm* — Oblon, McClelland, Maier & Neustadt, L.L.P.

(57) ABSTRACT

A motor control system includes a motor having an output line, motor control circuitry that includes DC bus lines and a smoothing capacitor between the DC bus lines and converts DC power supplied from outside the motor control circuitry into AC power and supply the AC power to the motor as driving power, and short circuit circuitry that, while the motor control circuitry is not supplying the driving power to the motor, makes a short circuit between the output line of the motor and a negative line of the DC bus lines of the motor control circuitry.

16 Claims, 10 Drawing Sheets

(56) References Cited

U.S. PATENT DOCUMENTS

| | | | | |
|---|---|---|---|---|
| 2010/0315027 A1* | 12/2010 | Wystup | ............... | H02P 6/085 |
| | | | | 318/400.3 |
| 2012/0068637 A1 | 3/2012 | Iwashita et al. | | |
| 2013/0194840 A1* | 8/2013 | Huselstein | ............ | H02M 1/32 |
| | | | | 363/50 |
| 2015/0061423 A1* | 3/2015 | Nagao | ................ | H02K 5/225 |
| | | | | 310/52 |

FOREIGN PATENT DOCUMENTS

| | | |
|---|---|---|
| JP | 2002-199744 A | 7/2002 |
| JP | 2005-204355 A | 7/2005 |
| JP | 2011-24326 A | 2/2011 |
| JP | 4917680 B1 | 4/2012 |

* cited by examiner

MOTOR CONTROL SYSTEM, METHOD FOR ACTIVATING MOTOR CONTROL SYSTEM, AND MOTOR CONTROL ASSISTANCE DEVICE

CROSS-REFERENCE TO RELATED APPLICATIONS

The present application claims priority under 35 U.S.C. § 119 to Japanese Patent Application No. 2016-245764, filed Dec. 19, 2016. The contents of this application are incorporated herein by reference in their entirety.

BACKGROUND

Field of the Invention

The embodiments disclosed herein relate to a motor control system, a method for activating a motor control system, and a motor control assistance device.

Discussion of the Background

JP4917680B1 discloses a motor drive apparatus that, when direct-current (DC) link voltage of a pulse width modulation (PWM) inverter has exceeded a predetermined threshold, causes regeneration power from the motor to be consumed at a resistor.

SUMMARY

According to one aspect of the present invention, a motor control system includes a motor having an output line, motor control circuitry that includes DC bus lines and a smoothing capacitor between the DC bus lines and converts DC power supplied from outside the motor control circuitry into AC power and supply the AC power to the motor as driving power, and short circuit circuitry that, while the motor control circuitry is not supplying the driving power to the motor, makes a short circuit between the output line of the motor and a negative line of the DC bus lines of the motor control circuitry.

According to another aspect of the present invention, a method for activating a motor control system includes instructing a short circuit circuitry to make a short-circuit between an output line and a negative line, instructing power source regeneration conversion circuitry to start converting AC power supplied from a commercial power source into DC power, connecting the motor control circuitry to DC-to-DC converter to supply the DC power lowered by the DC-to-DC converter to the motor control circuitry, and instructing the short circuit circuitry to open the short circuit between the output line and the negative line. The motor control system includes a motor having the output line, the motor control circuitry that includes DC bus lines and a smoothing capacitor between the DC bus lines and converts the DC power supplied from outside the motor control circuitry into AC power and supply the AC power converted from the DC power to the motor as driving power, the short circuit circuitry that, while the motor control circuitry is not supplying the driving power to the motor, makes the short circuit between the output line of the motor and the negative line of the DC bus lines of the motor control circuitry, the power source regeneration conversion circuitry that is connected to the negative line of the DC bus lines of the motor control circuitry and supplies the DC power to the motor control circuitry, and DC-to-DC converter circuitry that is connected to the negative line of the motor to lower the DC power supplied from the power source regeneration conversion circuitry and supplies the DC power lowered by the DC-to-DC converter circuitry to the motor control circuitry.

According to yet another aspect of the present invention, a motor control assistance device includes a connection switch that makes a short circuit between an output line of a motor and a negative line of motor control circuitry that converts DC power supplied from outside the motor control circuitry into AC power and supply the AC power to the motor as driving power. The connection switch makes the short circuit while the motor control circuitry is not supplying the driving power to the motor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6 shows timing charts associated with a contactor operation with control power on;

DESCRIPTION OF THE EMBODIMENTS

First Embodiment

Figure 1:
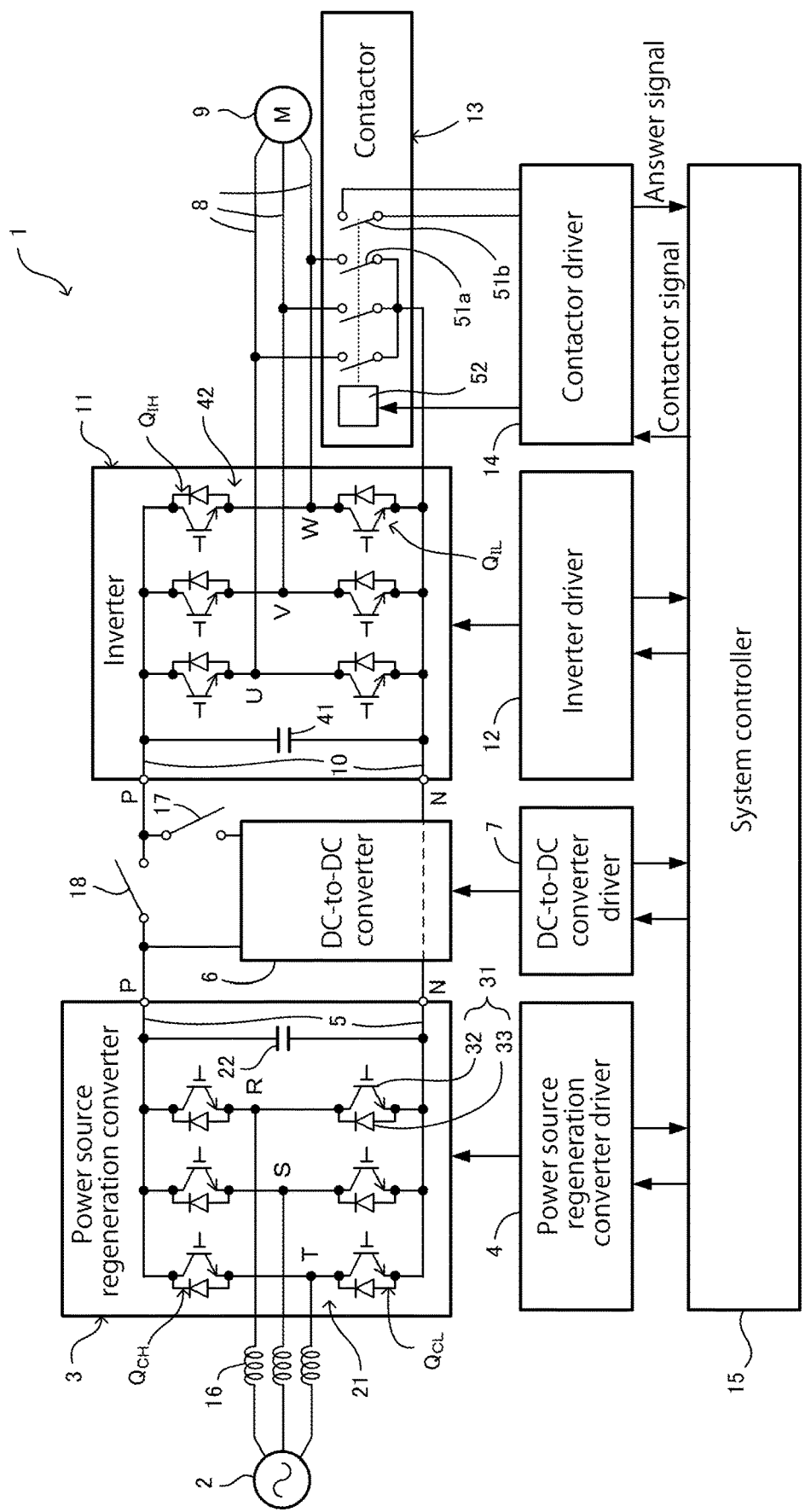
FIG. 1 is a diagram of a hardware circuit configuration of a motor control system according to a first embodiment.

The embodiments will now be described with reference to the accompanying drawings, wherein like reference numerals designate corresponding or identical elements throughout the various drawings.

Schematic Configuration of Motor Control System According to First Embodiment

By referring to FIG. 1, description will be made with regard to a hardware circuit configuration of a motor control system 1 according to the first embodiment. As illustrated in FIG. 1, the motor control system 1 includes a power source regeneration converter 3, a power source regeneration converter driver 4, a DC-to-DC converter 6, a DC-to-DC converter driver 7, an inverter 11, an inverter driver 12, a contactor 13, a contactor driver 14, and a system controller 15. The power source regeneration converter 3 is connected to a three-phase alternating-current (AC) power source 2 (commercial power source). The power source regeneration converter driver 4 controls the driving of the power source regeneration converter 3. The DC-to-DC converter 6 is connectable to the power source regeneration converter 4 through input-side DC bus lines 5. The DC-to-DC converter driver 7 controls the driving of the DC-to-DC converter 6. The inverter 11 is connected to a motor 9 through output lines 8 and connectable to the DC-to-DC converter 6 through output-side DC bus lines 10. The inverter driver 12 controls the driving of the inverter 11. The contactor 13 switches between making and opening a short circuit between the output lines 8 and a negative line N of the inverter 11. The contactor driver 14 controls the driving of the contactor 13.

The power source regeneration converter 3 includes an input-side bridge circuit 21 and an input-side smoothing capacitor 22.

The input-side bridge circuit 21 is a device that includes six bridge-connected arm switching elements 31. Each of the six arm switching elements 31 is a semiconductor such as insulated gate bipolar transistor (IGBT), metal-oxide-semiconductor field-effect transistor (MOSFET), and high electron mobility transistor (HEMT). Specifically, each a in switching element 31 includes a semiconductor switching element 32 and a flywheel diode 33, which is a flywheel diode (FWD). The semiconductor switching element 32 and the flywheel diode 33 are connected in parallel to each other. A pair of such arm switching elements 31 are connected in series to each other. Three pairs of arm switching elements 31 are connected in parallel to each other through the input-side DC bus lines 5. In the three pairs of arm switching elements 31, the arm switching elements 31 connected to the positive side (positive line P side) line of the input-side DC bus lines 5 will be referred to as upper-arm switching elements $Q_{CH}$, and the arm switching elements 31 connected to the negative side (negative line N side) line of the input-side DC bus lines 5 will be referred to as lower-arm switching elements $Q_{CL}$. An intermediate point located in the middle of the upper-arm switching element $Q_{CH}$ and the lower-arm switching element $Q_{CL}$ is connected to phase R, S, or T of the three-phase AC power source 2 through a reactor 16.

The input-side smoothing capacitor 22 extends across the input-side DC bus lines 5 and smoothens DC power that has been subjected to full-wave rectification and boosted at the input-side bridge circuit 21 and the reactor 16, as described later.

The power source regeneration converter driver 4 receives a drive control signal input from the system controller 15, described later. Based on the drive control signal, the power source regeneration converter driver 4 controls gate-source voltage of each of the arm switching elements 31 of the input-side bridge circuit 21, so as to switch the gate-source voltage between ON state and OFF state. The power source regeneration converter driver 4 performs switching control with respect to the arm switching elements 31 in a synchronous manner with the respective phases of the AC power of the three-phase AC power source 2. This causes the input-side bridge circuit 21 and the reactor 16 to full-wave rectify and boost the AC power, thereby converting the AC power into DC power, and to supply the DC power to the input-side DC bus line 5.

In this manner, the power source regeneration converter 3 rectifies, boosts, and smoothens AC power supplied from the three-phase AC power source 2 to convert the AC power into DC power, and outputs the DC power to the input-side DC bus line 5. The power source regeneration converter 3 and the power source regeneration converter driver 4 are non-limiting examples of the power source regeneration converter recited in the appended claims.

The DC-to-DC converter 6 is a "stepdown switching regulator". In the DC-to-DC converter 6, the DC-to-DC converter 6 includes a plurality of semiconductor switching elements, a flywheel diode, and a reactor (circuit details are not illustrated). The DC-to-DC converter driver 7 receives a drive control signal input from the system controller 15, described later. Based on the drive control signal, the DC-to-DC converter driver 7 controls gate-source voltage of each of the semiconductor switching elements of the DC-to-DC converter 6, so as to switch the gate-source voltage between ON state and OFF state. The DC-to-DC converter driver 7 performs switching control with respect to the semiconductor switching elements initially at a low duty ratio. This causes the DC-to-DC converter 6 to temporarily lower the voltage of the DC power that has been supplied from the power source regeneration converter 3 through the input-side DC bus lines 5 and to supply the resulting DC power to the output-side DC bus lines 10 of the inverter 11. Then, the DC-to-DC converter driver 7 gradually increases the duty ratio, causing the DC-to-DC converter 6 to gradually increase the voltage supplied to the inverter 11 up to the output voltage of the power source regeneration converter 3.

With this configuration, the DC-to-DC converter 6 prevents an excessive amount of rush current from flowing from the power source regeneration converter 3 to the inverter 11 at the system activation time (feeding start time), resulting in smoother supply of DC power. The DC-to-DC converter 6 and the DC-to-DC converter driver 7 are non-limiting examples of the DC-to-DC converter recited in the appended claims.

The inverter 11 includes an output-side smoothing capacitor 41 and an output-side bridge circuit 42.

The output-side smoothing capacitor 41 extends across the output-side DC bus lines 10 and stores: DC power supplied from the DC-to-DC converter 6 or from the power source regeneration converter 3; and regeneration DC power from the motor 9.

The output-side bridge circuit 42 has a configuration similar to the configuration of the input-side bridge circuit 21. Specifically, the output-side bridge circuit 42 is a device that includes six bridge-connected arm switching elements 31. Each of the six bridge-connected arm switching elements 31 is a semiconductor such as insulated gate bipolar transistor (IGBT), metal-oxide-semiconductor field-effect transistor (MOSFET), and high electron mobility transistor (HEMT). Specifically, each arm switching element 31 includes a semiconductor switching element 32 and a diode 33, which is a flywheel diode (FWD). The semiconductor switching element 32 and the flywheel diode 33 are connected in parallel to each other. A pair of such arm switching elements 31 are connected in series to each other. Three pairs of arm switching elements 31 are connected in parallel to each other through the input-side DC bus lines 5. In the three pairs of arm switching elements 31, the arm switching elements 31 connected to the positive side (positive line P side) line of the output-side DC bus lines 10 will be referred to as upper-arm switching elements $Q_{IH}$, and the arm switching elements 31 connected to the negative side (negative line N side) line of the output-side DC bus lines 10 will be referred to as lower-arm switching elements $Q_{IL}$. An intermediate point located in the middle of the upper-arm switching element $Q_{IH}$ and the lower-arm switching element $Q_{IL}$ is connected to a winding coil of phase U, V, or W of the motor 9 through the output lines 8.

The inverter driver 12 receives a drive control signal input from the system controller 15, described later. Based on the drive control signal, the inverter driver 12 controls gate-source voltage of each of the arm switching elements 31 of the output-side bridge circuit 42, so as to switch the gate-source voltage between ON state and OFF state. The inverter driver 12 performs switching control with respect to the arm switching elements 31 by pulse width modulation (PWM) control. This causes the output-side bridge circuit 42 to convert the DC power of the output-side DC bus lines 10 into AC power and to supply the AC power as driving power to the motor 9 through the output lines 8.

With this configuration, the inverter 11 receives DC power supplied from the DC-to-DC converter 6 or the power source regeneration converter 3 through the output-side DC bus lines 10, and converts the DC power into AC power of a desired amplitude, frequency, and phase. Then, the inverter 11 outputs the AC power as driving power to the motor 9. The inverter 11 and the inverter driver 12 are non-limiting examples of the motor controller recited in the appended claims.

Figure 3:
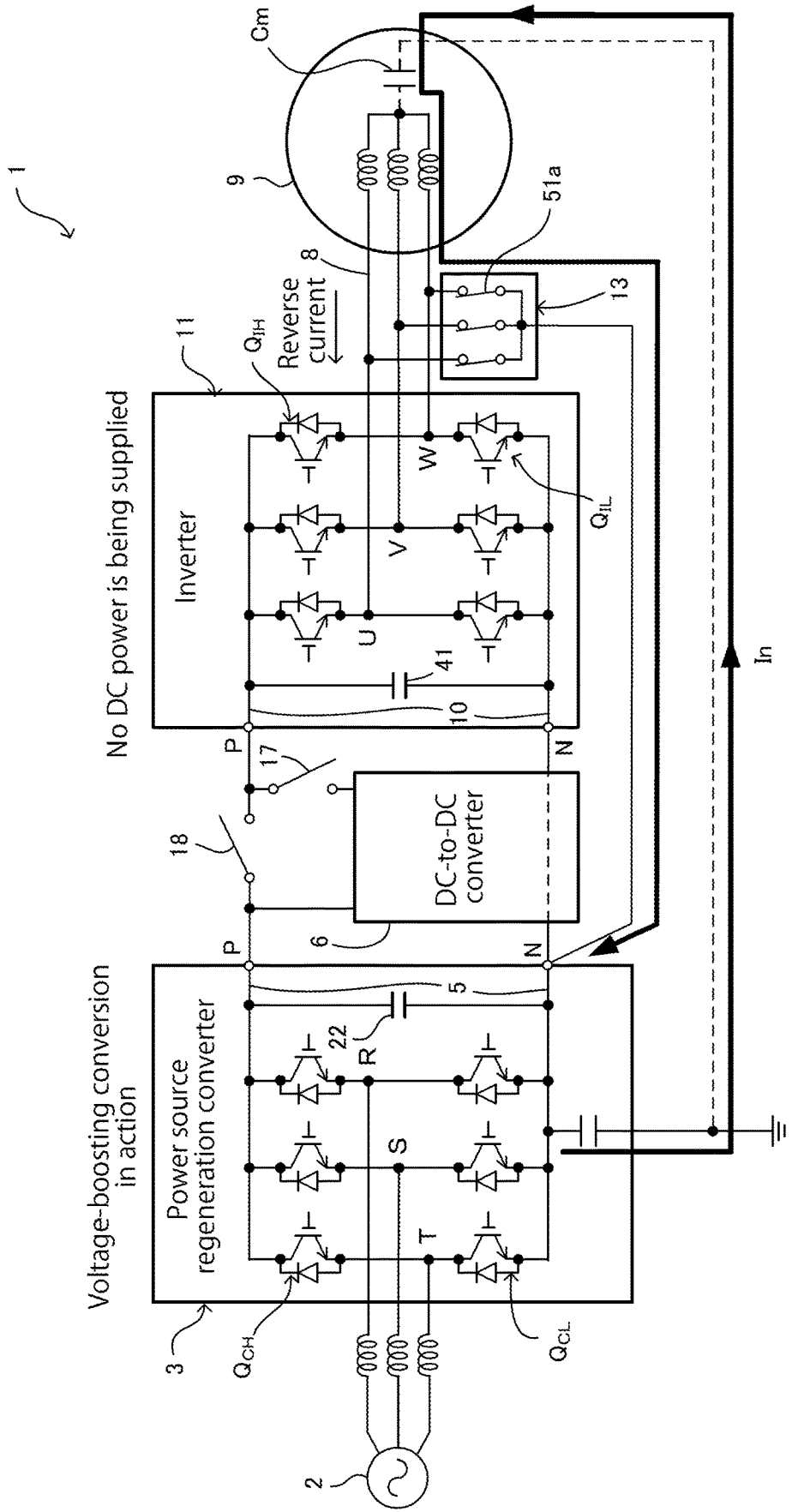
FIG. 3 is the first embodiment, in which a contactor is provided, illustrating an occurrence of reverse current and a path through which the reverse current flows.

The contactor 13 is a "relay" that includes four contact points and one electromagnet 52. Three of the four contact points are short-circuit contact points 51a. The short-circuit contact points 51a are connected to the respective output lines 8, which respectively correspond to phases U, V, and W of the motor 9. The short-circuit contact points 51a are also connected to the negative line N of the output-side DC bus lines 10 of the inverter 11 (or to the negative terminal of the power source regeneration converter 3 as illustrated in FIG. 3, described later). With this configuration, the short-circuit contact points 51a switch between making and opening a short circuit between the negative line N and the output lines 8 (or the negative terminal of the power source regeneration converter 3). The other contact point is an auxiliary contact point 51b. The auxiliary contact point 51b switches between making and opening a short circuit using the electromagnet 52, which is common to the auxiliary contact point 51b and the short-circuit contact points 51a.

The contactor driver 14 receives a drive control signal input from the system controller 15, described later. Based on the drive control signal, the contactor driver 14 switches the state of the electromagnet 52 between ON state and OFF state, that is, switches between making and opening a short circuit in all of the four contact points 51 simultaneously. The contactor driver 14 outputs to the system controller 15 an answer signal that is based on the connection state of the auxiliary contact point 51b.

With this configuration, the contactor 13 operates in a "normally off" configuration, in which when the electromagnet 52 is in ON state, all the contact points 51 are short-circuited, while when the electromagnet 52 is in OFF state, all the contact points 51 are opened. The contactor 13 is a non-limiting example of the connection switch and the motor control assistance device recited in the appended claims. The control-related elements of the contactor driver 14 and the system controller 15 associated with the contactor operation are non-limiting examples of the switch controller recited in the appended claims. The control-related elements of the contactor 13, the contactor driver 14, and the system controller 15 associated with the contactor operation are non-limiting examples of the short circuit executor recited in the appended claims.

The system controller 15 is made up of elements such as CPU, and sends and receives drive control signals and various detection signals to and from the power source regeneration converter driver 4, the DC-to-DC converter driver 7, the inverter driver 12, and the contactor driver 14. In this manner, the system controller 15 controls the operation of the entirety of the motor control system 1.

A first switch 17 and a second switch 18 are located at portions of the positive line P surrounded by the power source regeneration converter 3, the DC-to-DC converter 6, and the inverter 11. The first switch 17 connects and disconnects the positive-side output of the DC-to-DC converter 6 to and from the positive line P of the output-side DC bus lines 10 of the inverter 11. The second switch 18 connects and disconnects the positive line P of the input-side DC bus lines 5 at the power source regeneration converter 3 side and the positive line P of the output-side DC bus lines 10 at the inverter 11 side to and from each other. The system controller 15 is capable of controlling the first switch 17 and the second switch 18 individually (not illustrated). The power source regeneration converter 3, the DC-to-DC converter 6, and the inverter 11 are connected to each other through the common negative line N.

Activation Sequence of Motor Control System Outlined

An activation sequence of the motor control system 1 having the above-described configuration will be outlined. An operation of the contactor 13 will be described later.

Referring to FIG. 1, the motor control system 1 is first in pre-activation state, that is, power is not yet supplied to the entirety of the motor control system 1. In this pre-activation state, no bus-to-bus voltage (0V) is being applied across the input-side DC bus lines 5 (the input-side smoothing capacitor 22) and across the output-side DC bus lines 10 (the output-side smoothing capacitor 41). In order to activate the motor control system 1 in the pre-activation state, control power is applied to the system controller 15. Then, the system controller 15 turns the first switch 17 and the second switch 18 into open state so as to prevent supply of power among the power source regeneration converter 3, the DC-to-DC converter 6, and the inverter 11. It is noted, however, that the power source regeneration converter 3, the DC-to-DC converter 6, and the inverter 11 are any time connected to each other through the common negative line N, which is on the negative side of the DC bus lines, as described above.

Next, through the power source regeneration converter driver 4, the system controller 15 controls the power source regeneration converter 3 to perform switching control of rectifying, boosting, and smoothening AC power from the three-phase AC power source 2. Thus, the bus-to-bus voltage across the input-side DC bus lines 5 is increased. After the bus-to-bus voltage across the input-side DC bus lines 5 has reached a predetermined voltage, the system controller 15 turns the first switch 17 into connection state. While the first switch 17 is in connection state, the DC-to-DC converter 6 is prevented from performing switching control so that no DC current flows through the first switch 17, that is, substantially no DC power is supplied to the inverter 11 from the power source regeneration converter 3.

Then, through the DC-to-DC converter driver 7, the system controller 15 controls the DC-to-DC converter 6 to perform switching control so as to start supply of DC power from the input-side DC bus lines 5 of the power source regeneration converter 3 to the output-side DC bus lines 10 of the inverter 11. In the switching control performed by the DC-to-DC converter 6, the duty ratio is initially 0%, which is referred to as non-feeding state. Then, the duty ratio is gradually increased so as to allow a suitable amount of DC current to flow through the positive line P of the output-side DC bus lines 10 of the inverter 11 and to be stored on the output-side smoothing capacitor 41. This configuration prevents an excessive amount of rush current from flowing to the inverter 11 at the feeding start time, resulting in safer and smoother start of DC power supply.

When the duty ratio of the DC-to-DC converter 6 has reached 100% and when the input-side DC bus-to-bus voltage and the output-side DC bus-to-bus voltage have become equivalent to each other, the system controller 15 turns the second switch 18 into connection state and turns the first switch 17 into open state. This causes the DC-to-DC converter 6 to separate from the DC bus lines so as to enable direct supply of DC power to the inverter 11 from the power source regeneration converter 3. With DC power supplied to the inverter 11, the inverter driver 12 performs switching control by PWM control with respect to the inverter 11 so as to cause AC driving power to be supplied to the motor 9 through the output lines 8.

Features of the First Embodiment

As described above, a typical inverter controls the driving of a motor by performing PWM control or similar control to convert DC power supplied from outside the inverter into AC power, and supplying the AC power as driving power in a direction toward the motor.

In some particular configurations of motor control systems, however, noise current may occur due to some external factor, and a ground stray capacity in the motor may cause the noise current to inversely flow into the inverter, even though the inverter is not supplying driving power to the motor, that is, while no current is being supplied to the motor (non-excitation time). If reverse current flows into the inverter from the motor while no current is being supplied to the motor, the inside of the inverter may be electrically affected in an adverse sense.

Specifically, many inverters are equipped with an output-side smoothing capacitor, such as the above-described output-side smoothing capacitor 41, for the purpose of stabilizing the DC voltage across the positive line P and the negative line N. If the above-described reverse current flows into the inverter, the output-side smoothing capacitor may be charged with the reverse current, even though no current is being supplied to the motor. This may increase the output-side DC bus-to-bus voltage (the voltage across the positive line P and the negative line N), as illustrated in see FIG. 2, described later, even though the inverter should be in no-voltage state.

Figure 2:
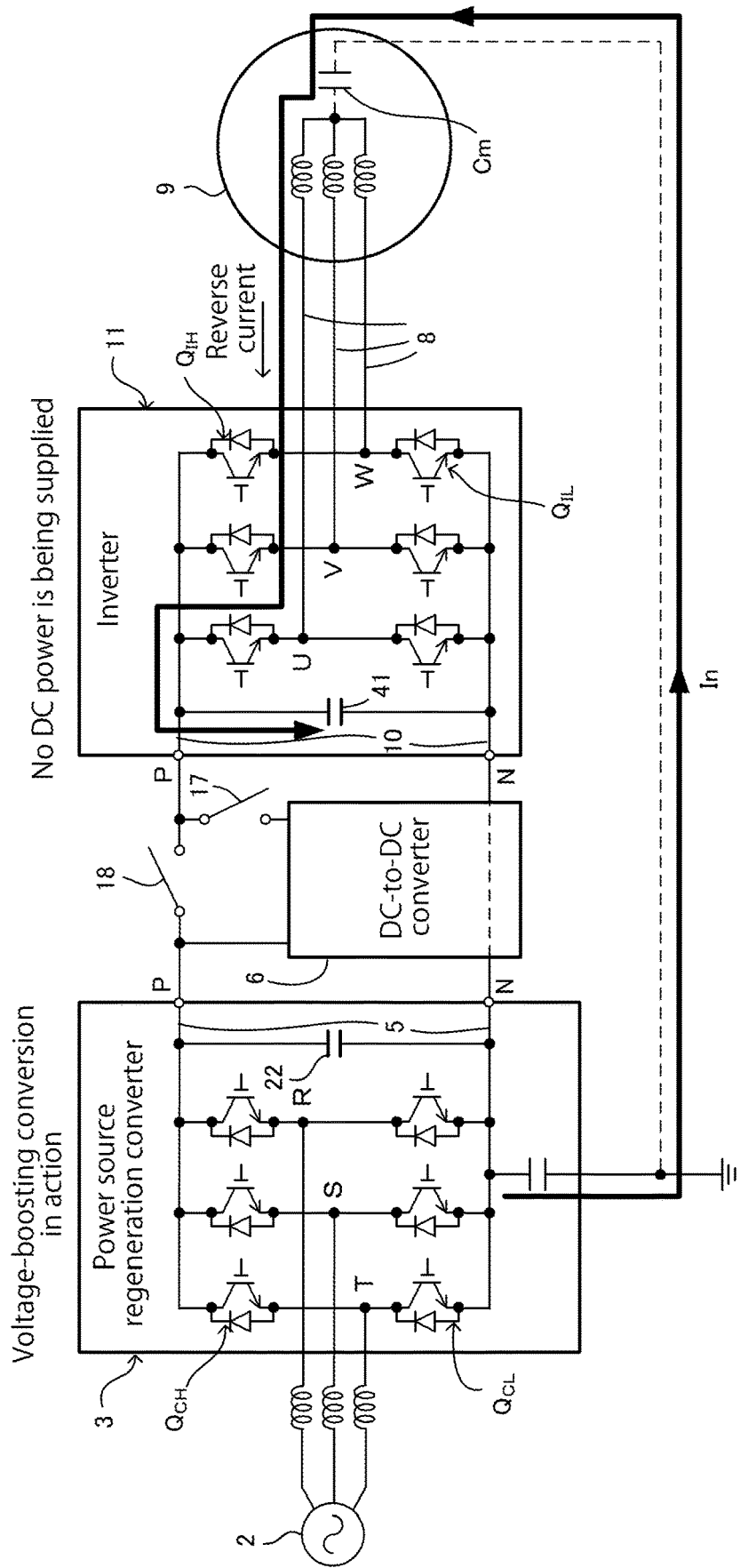
FIG. 2 is a diagram of a comparative example in which no contactor is provided, illustrating an occurrence of reverse current and a path through which the reverse current flows.

In light of the circumstances, the motor control system 1 according to the first embodiment includes the contactor 13 and the contactor driver 14. The contactor 13 and the contactor driver 14 make a short circuit between the output lines 8 of the motor 9 and the negative line N of the output-side DC bus lines 10 of the inverter 11 while the inverter 11 is not supplying driving power to the motor 9. The short circuit forms a path to the negative line N of the inverter 11 so that reverse current, if any, flowing from the motor 9 toward the inverter 11 flows through the path to the negative line N, instead of flowing into the inverter 11. This eliminates or minimizes an electrical, adverse effect on the inside of the inverter 11. Adverse Effects of Reverse Current Flowing from Motor to Inverter and How to Deal with Reverse Current FIG. 2 is a diagram of a comparative example in which no contactor 13 is provided, illustrating an occurrence of reverse current and a path through which the reverse current flow. To avoid complicated illustration, the drivers 4, 7, 12, and 14 and the system controller 15 are not illustrated.

When the motor control system 1 is activated without making any changes to the above-described activation sequence, the output-side DC bus-to-bus voltage in the inverter 11 may show an unintentional, sharp increase. This is because when the power source regeneration converter 3 performs switching control of boosting and converting the input-side DC bus-to-bus voltage, the switching control causes noise current In to occur, and the noise current In passes through a ground stray capacity Cm of the motor 9 and flows into the inverter 11 as reverse current. The ground stray capacity Cm is a capacity of the motor 9 provided with respect to the ground.

Specifically, the power source regeneration converter 3, the DC-to-DC converter 6, and the inverter 11 are connected to the common negative line N, as described above, and the negative line N is grounded through a system FG. The ground stray capacity Cm, which is a capacity connected to the ground, is inherent in the winding coils of the motor 9. Therefore, even though neutral points of the winding coils of the motor 9 are not grounded, the noise current In, which results from the switching control performed by the power source regeneration converter 3, flows into the winding coils of the motor 9 through the ground stray capacity Cm and then flows as reverse current into the inverter 11 through the output lines 8.

Then, the reverse current passes in forward direction through the flywheel diodes 33 of the upper-arm switching elements $Q_{H}$ of the inverter 11, flows into the positive line P of the output-side DC bus lines 10, and charges the output-side smoothing capacitor 41 (see the bold solid arrow in FIG. 2). When the charging by the reverse current lasts for a long period of time, it is possible that the output-side DC bus-to-bus voltage, which should be in no voltage (0V) state, is increased to as high as hundreds of volts (see Vr, described later by referring to FIG. 4).

With the output-side DC bus-to-bus voltage in this state, assume that the first switch 17 is turned into connection state and thus the DC-to-DC converter 6 is connected to the output-side DC bus lines 10. In this case, an inverse voltage (see Vr, described later by referring to FIG. 4) much higher than the input-side DC bus-to-bus voltage may be applied to the DC-to-DC converter 6, causing damage or other electrical adverse effects to the semiconductor switching elements located inside the DC-to-DC converter 6.

Figure 4:
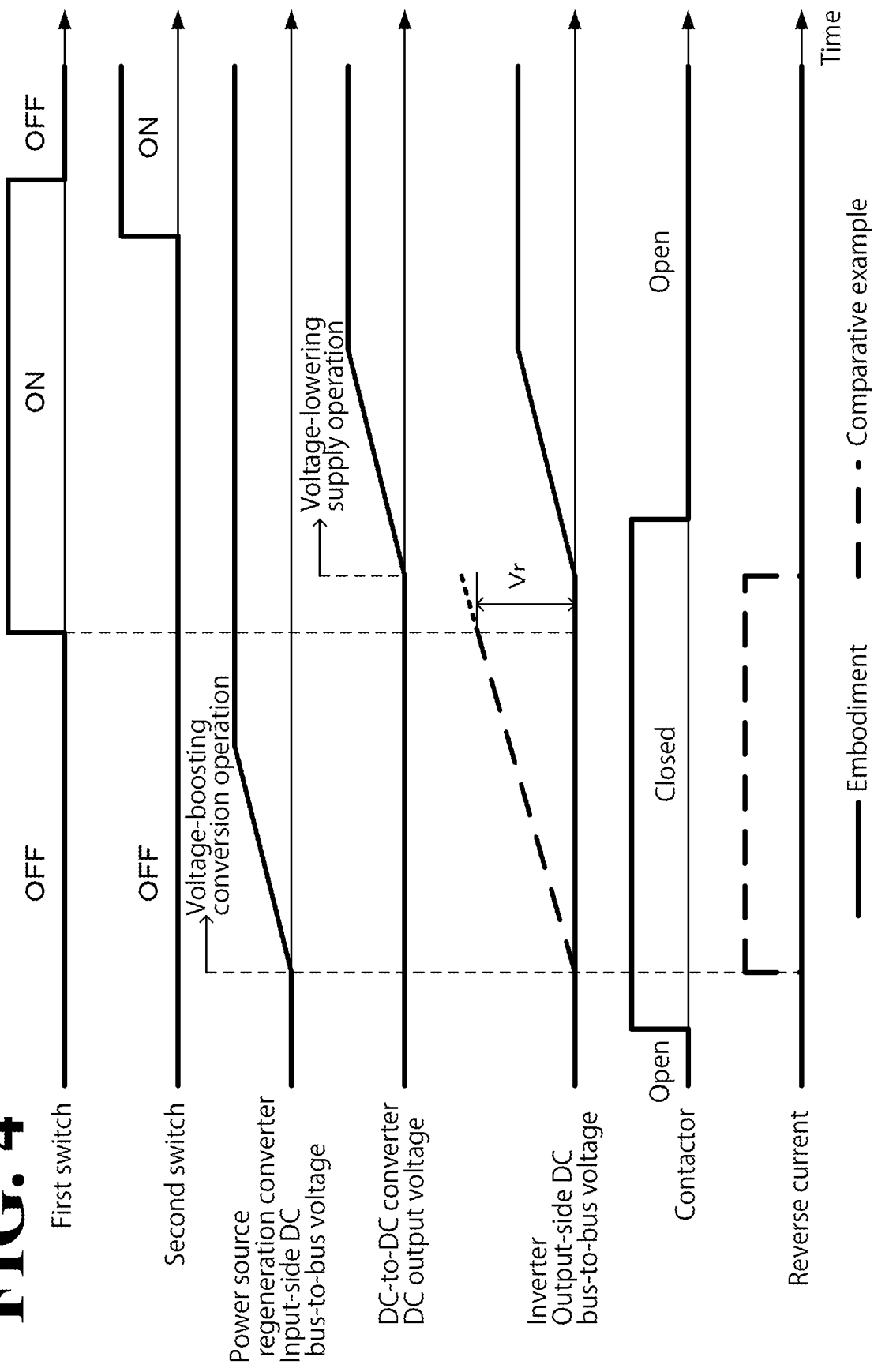
FIG. 4 shows an activation sequence over time employed in the comparative example and an activation sequence over time employed in the first embodiment superimposed on the activation sequence employed in the comparative example.

In light of the circumstances, the motor control system 1 according to the first embodiment has the configuration illustrated in FIG. 3. Specifically, when the above-described reverse current occurs in the motor control system 1, all the contact points 51 of the contactor 13 are turned into connection state, forming a circumvention path to the negative line N of the inverter 11 (or the power source regeneration converter 3 as illustrated in FIG. 3). The circumvention path prevents the reverse current from flowing into the inverter 11 and thus prevents the output-side DC bus-to-bus voltage from increasing. Activation Sequence according to the First Embodiment Including Contactor Operation FIG. 4 shows an activation sequence employed in comparative example illustrated in FIG. 2 (see broken lines) and an activation sequence employed in the first embodiment illustrated in FIG. 3 (see solid lines). Specifically, FIG. 4 shows, from top to bottom, the ON/OFF state of the first switch 17, the ON/OFF state of the second switch 18, the input-side DC bus-to-bus voltage of the power source regeneration converter 3, the DC output voltage of the DC-to-DC converter 6, the output-side DC bus-to-bus voltage of the inverter 11, the open/closed state of the contactor 13, and the presence or absence of reverse current.

Referring to FIG. 4, reverse current occurs between the time at which the power source regeneration converter 3 starts switching control for voltage-boosting conversion operation and the time at which the DC-to-DC converter 6 starts switching control for voltage-lowering supply operation. The contactor 13, therefore, may be turned into closed state at least once in or throughout the period of time for which the reverse current occurs (in the embodiment illustrated in FIG. 4, the contactor 13 is in closing operation throughout the period). This configuration prevents the output-side DC bus-to-bus voltage of the inverter 11 from increasing and prevents inverse voltage from being applied to the DC-to-DC converter 6 when the first switch 17 is turned into connection state and thus the DC-to-DC converter 6 is connected to the output-side DC bus lines 10. It should be noted that the power source regeneration converter 3 continues the voltage-boosting conversion operation in normal driving of the system after system activation, but when the second switch 18 is in connection state, the input-side DC bus-to-bus voltage and the output-side DC bus-to-bus voltage are equivalent to each other, causing no reverse current to occur. For the period for which no reverse current occurs, it is not necessary to turn the contactor 13 into closed state.

As has been described hereinbefore, the activation sequence employed in the motor control system 1 according to the first embodiment includes, in the order of recitation: the contactor 13 makes a short circuit between the negative line N and the output lines 8; the power source regeneration converter 3 starts voltage-boosting conversion operation of converting AC power from the three-phase AC power source 2 into DC power; the power source regeneration converter 3 starts voltage-lowering supply operation by turning the first switch 17 into connection state to connect the inverter 11 to the DC-to-DC converter 6; and the contactor 13 opens the connection between the negative line N and the output lines 8.

As described later, it is sometimes or often necessary to operate the contactor 13 in normal driving of the system after system activation as well. However, in normal driving of the system, if the contactor 13 and any one of the upper-arm switching elements $Q_{IH}$ of the inverter 11 are in connection state simultaneously (ON state, closed state), a vertical short circuit results between the output-side DC bus lines 10. In light of the circumstances, the contactor 13 is caused to perform closing operation at least while all the upper-arm switching elements $Q_{IH}$ of the inverter 11 are reliably in OFF state to cause no driving power to be supplied to the motor 9, that is, while the motor 9 is in OFF state (non-excitation state). Contrarily, while the motor 9 is ON state (excitation state), the contactor 13 must be in open state.

Details of Contactor Operation

I. Normal Operation of Contactor

Figure 5:
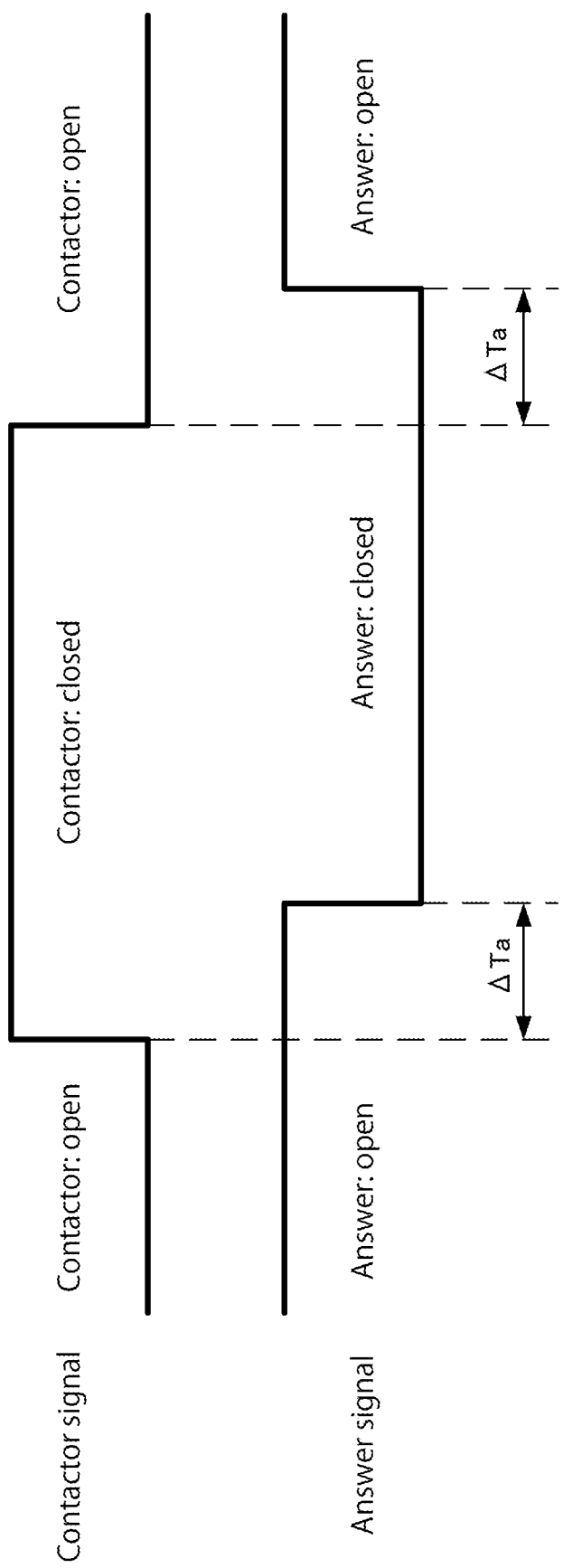
FIG. 5 shows timing charts of a contactor signal to a contactor driver and an answer signal from the contactor driver.

FIG. 5 shows timing charts of a contactor signal to the contactor driver 14 and an answer signal from the contactor driver 14. Referring to FIG. 5, the contactor signal is a control signal that the system controller 15 outputs to the contactor driver 14. Upon receipt of the contactor signal, the contactor driver 14 causes current to flow through the electromagnet 52 of the contactor 13 so as to turn all the contact points 51 into connection state. The answer signal is a response signal that the contactor driver 14 outputs to the system controller 15 after detecting a connection state of the auxiliary contact point 51b of the contactor 13. In the embodiment illustrated in FIG. 5, the contactor signal at High level demands that the contactor 13 be in closed state, while the contactor signal at Low level demands that the contactor 13 be in open state. The answer signal is output in antiphase relative to the contactor signal, that is, the answer signal at High level indicates that the contactor 13 is in open state, while the answer signal at Low level indicates that the contactor 13 is in closed state.

In normal situations, when the contactor signal is reversed and such contactor signal is output from the system controller 15 to the contactor driver 14, it takes a predetermined period of time for the answer signal to be reversed in accordance with the reversed contactor signal. In light of the circumstances, as illustrated in FIG. 5, the system controller 15 checks the answer signal upon elapse of a predetermined period of time $\Delta Ta$ after the contactor signal has been reversed. When the contactor signal and the answer signal indicate mutually different states, the system controller 15 assumes a possibility of abnormality, such as welding, of the contact points 51 and makes a notification of the abnormality.

Figure 6:
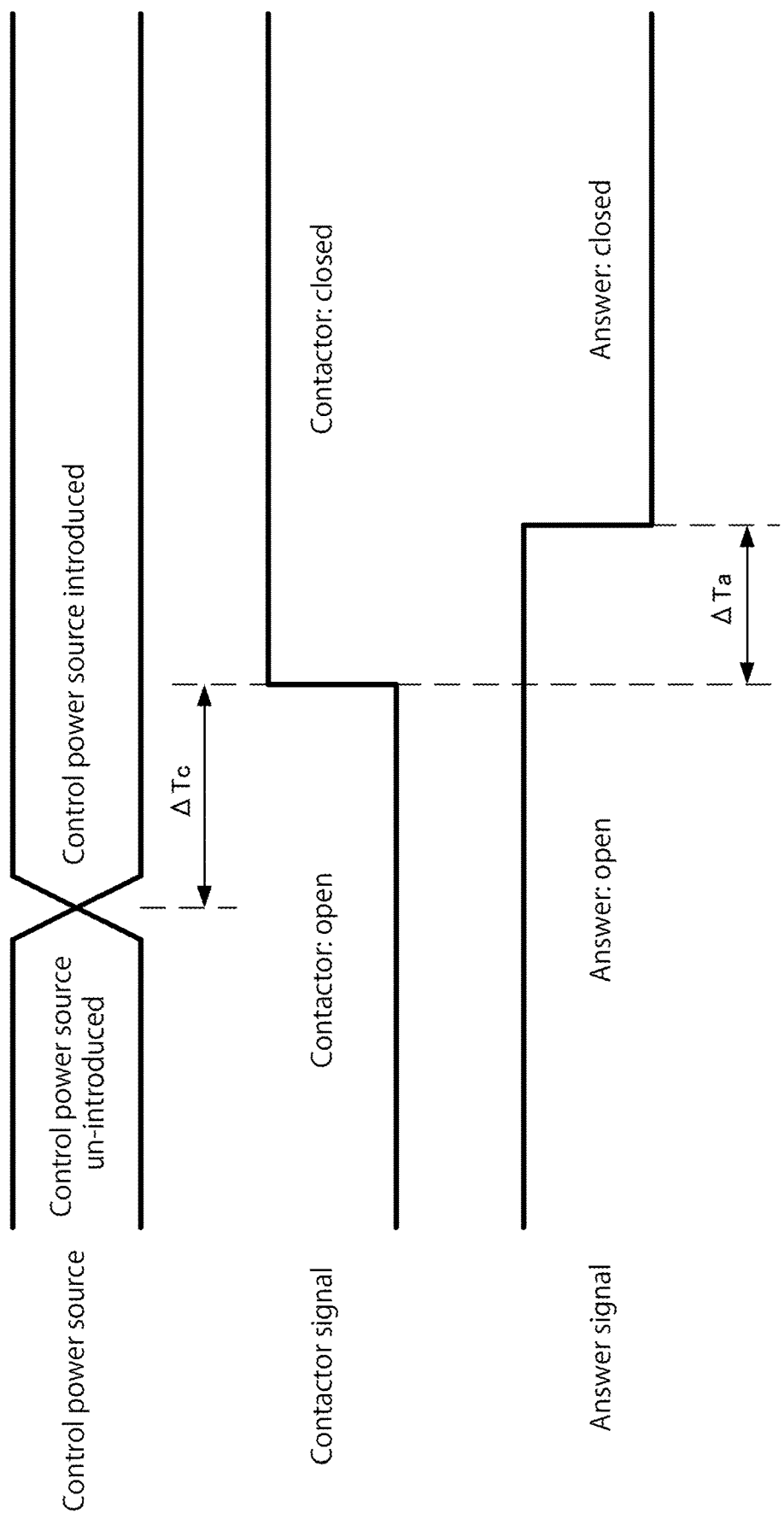

In the activation sequence illustrated in FIG. 4, the contactor 13 is caused to perform closing operation immediately before occurrence of reverse current, that is, immediately before the power source regeneration converter 3 starts voltage-boosting conversion operation. In another possible embodiment illustrated in FIG. 6, the contactor 13 may be caused to perform closing operation at the time when control power of the system controller 15 is on, in consideration of possible occurrence of reverse current caused by noise current from elements other than the power source regeneration converter 3. Specifically, the contactor signal is turned into closed state upon elapse of a predetermined period of time $\Delta Tc$ after control power is on, in consideration of stable operation of the system.

Figure 7:
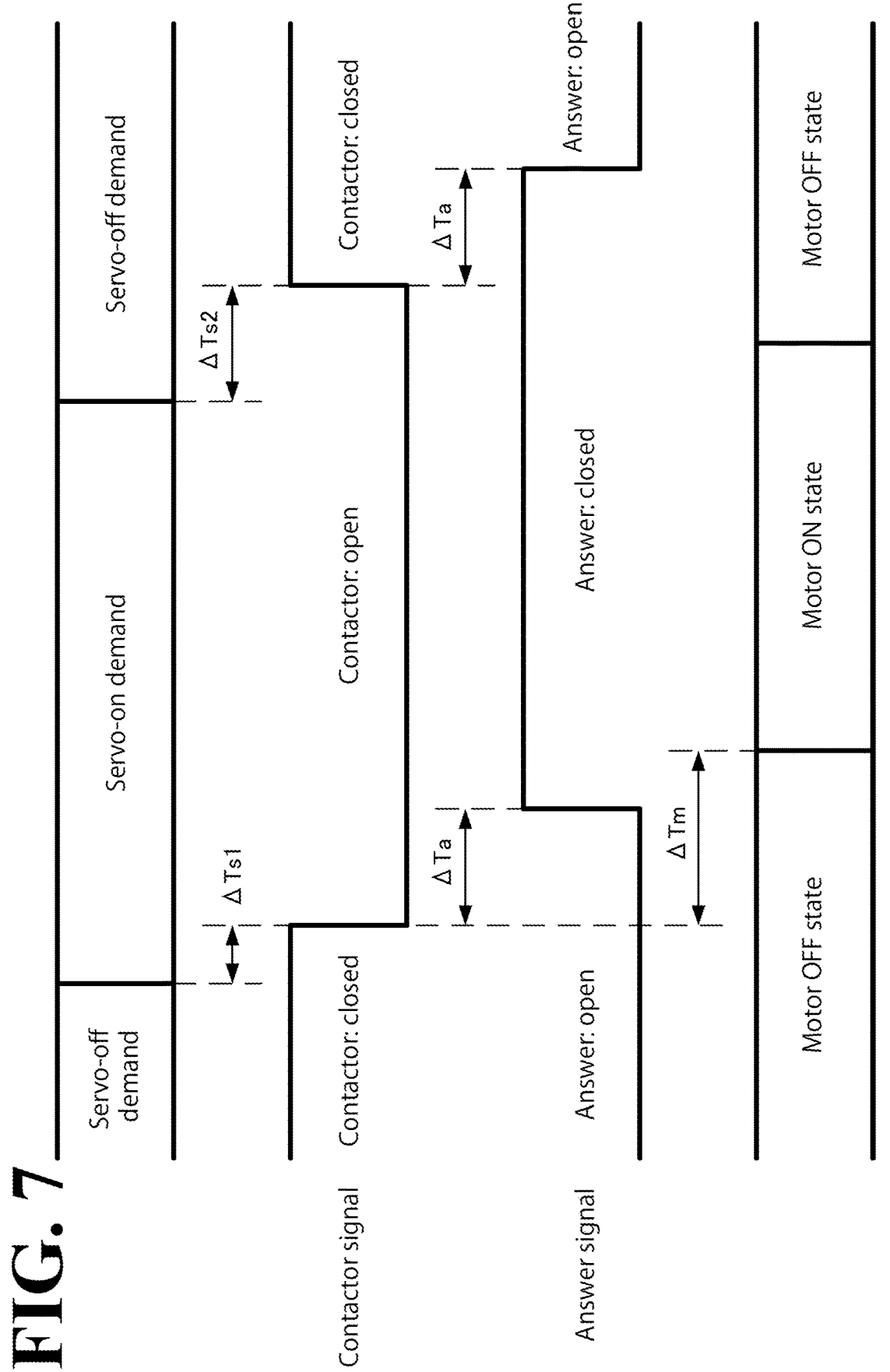
FIG. 7 shows timing charts of a contactor operation associated with a servo-on demand state and a motor-on state.

In still another possible embodiment illustrated in FIG. 7, in order to minimize influence of noise current from elements other than the power source regeneration converter 3, the contactor 13 may be caused to perform closing operation for a period of time during which the system controller 15 is not outputting a servo-on demand (which is a standby demand for switching control of the inverter 11) to the inverter driver 12, that is, the system controller 15 is outputting a servo-off demand to the inverter driver 12. While the motor is ON state, however, it is necessary to prevent the contactor 13 from performing closing operation, that is, it is necessary to avoid a vertical short circuit between the output-side DC bus lines 10, as described above. For this purpose, it is necessary to adjust reverse timing $\Delta Ta$ of the contactor signal and motor-on timing $\Delta Tm$. In consideration of stable operation of the system, the contactor signal is reversed upon elapse of a predetermined period of time $\Delta Ts1$ and a predetermined period of time $\Delta Ts2$ after timing of switching between servo-on demand and servo-off demand.

II. The Contactor is not Provided with Inherent Dynamic Brake Function

The contactor 13 according to the first embodiment is capable of connecting the output lines 8, which respectively correspond to the phases of the motor 9, to the common negative line N. In this sense, the contactor 13 is similar in configuration to a "dynamic brake" from a circuit point of view. Specifically, when the contactor 13 is caused to perform closing operation while the motor 9 is making slowing-down rotation, regeneration power of the phases of the motor 9 occurring on the winding coils of the motor 9 may be short-circuited through the contactor 13, causing the motor 9 to be suddenly stopped, similarly to a dynamic brake turned into operation. In the first embodiment, however, the contactor 13 preferably has as low an internal resistance as possible, in consideration of the contactor 13's main function to short-circuit reverse current, which is slight in amount, flowing through the output lines 8 to the negative line N. Therefore, if regeneration power is short-circuited through the contactor 13 in the first embodiment, a large amount of current may flow through the contact points 51, causing damage to the contact points 51, as opposed to an actual dynamic brake, which uses comparatively a large amount of resistance to consume regeneration power.

Figure 8:
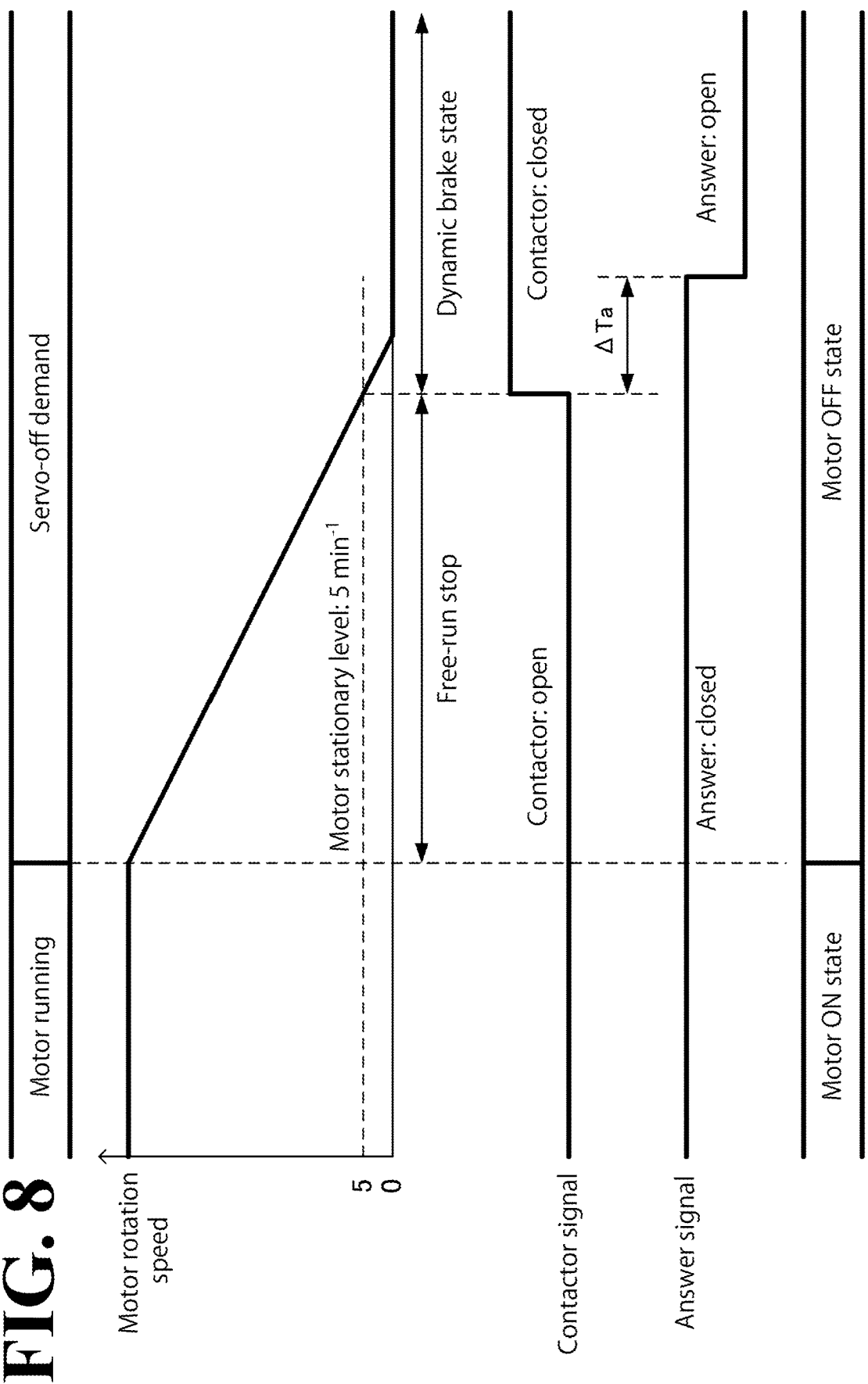
FIG. 8 shows timing charts of a contactor operation at the time when the motor is stationary.

In light of the circumstances, the contactor 13 according to the first embodiment is not caused to perform closing operation, even if the motor is in OFF state, until the rotation speed of the motor 9 becomes approximately zero, as illustrated in FIG. 8. That is, the contactor 13 is maintained at open state while the rotating motor 9 is making slowing-down rotation to a natural stop (free-run stop) after being turned into OFF state. When the regeneration power has reduced to a sufficiently small, approximately stationary level (a motor stationary level of 5 $\text{min}^{-1}$ as illustrated in FIG. 8), the contactor 13 is caused to perform closing operation, resulting in dynamic brake state. This configuration necessitates a detector, such as an encoder, to detect the motor speed in the motor control system 1 (not illustrated).

Figure 9:
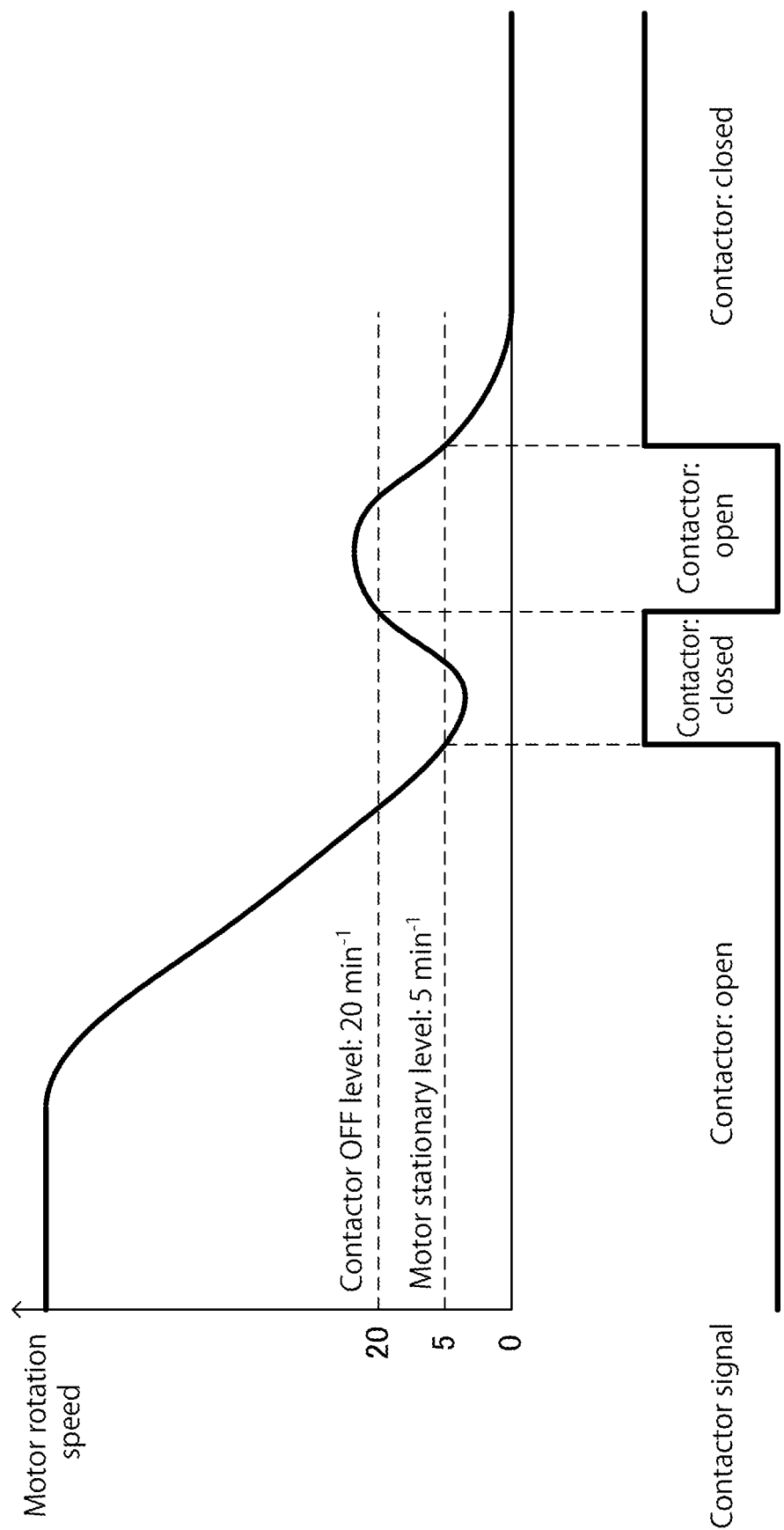
FIG. 9 shows hysteresis of a contactor operation associated with motor speed.

Also, some particular configuration of a driven machine (not illustrated) connected to the motor 9 may cause temporary regeneration power by external force or some other force even after the motor 9 has become approximately stationary. In light of the circumstances, as illustrated in FIG. 9, contactor OFF level is set at a speed (second speed, which is 20 $\text{min}^{-1}$ in FIG. 9) slightly higher than a motor stationary-level speed (first speed). When the motor speed is higher than the contactor OFF level, the contactor 13 is caused to perform opening operation. This configuration ensures that hysteresis properties for the contactor operation with respect to the speed of the motor 9 can be set based on the motor stationary level, which is comparatively low, and the contactor OFF level, which is comparatively high. This configuration, in turn, eliminates or minimizes chattering in the contactor 13 even if temporary regeneration power is caused to occur by external force or some other force after the motor 9 has stopped.

Advantageous Effects of the First Embodiment

As has been described hereinbefore, the motor control system 1 according to the first embodiment includes elements, such as the contactor 13 and the contactor driver 14, that make a short circuit between the output lines 8 of the motor 9 and the negative line N of the output-side DC bus lines 10 of the inverter 11 while the inverter 11 is not supplying driving power to the motor 9 (during motor OFF state). This configuration ensures that when reverse current occurs flowing from the motor 9 toward the inverter 11, a circumvention path to the negative line N of the inverter 11 is formed to prevent the reverse current from flowing into the inverter 11. This eliminates or minimizes an electrical, adverse effect on the inside of the inverter 11, resulting in improved maintainability of the motor control system 1.

Also in the first embodiment, the motor control system 1 includes the power source regeneration converter 3. The power source regeneration converter 3 performs switching control of the arm switching elements 31 and other elements to boost and convert AC power from the three-phase AC power source 2 to output DC output power. When the power source regeneration converter 3 is connected to the negative line N of the inverter 11, the above-described reverse current may be caused to occur even while the DC power from the power source regeneration converter 3 is not being supplied to the inverter 11. Specifically, the noise current In, which has been caused by the switching control involved in the voltage-boosting conversion operation of the power source regeneration converter 3, may flow into the inverter 11 through the ground stray capacity Cm, which is a capacity of the motor 9 with respect to the ground. In light of the circumstances, the motor control system 1 according to the first embodiment includes elements, such as the contactor 13 and the contactor driver 14, to implement a configuration that directs the reverse current to the negative line N.

Also in the first embodiment, before the power source regeneration converter 3 supplies DC power to the inverter 11, the above-described elements, such as the contactor 13 and the contactor driver 14, make a short circuit at least once in or throughout an operation period in which AC power from the three-phase AC power source 2 is boosted and converted into DC power. This configuration enables at least a part or all of the reverse current caused by the voltage-boosting conversion operation performed by the power source regeneration converter 3 to be directed to the negative line N. This configuration, in turn, prevents charging of the output-side smoothing capacitor 41 of the inverter 11 when no DC power is being supplied to the inverter 11. As a result, an abnormal increase in the output-side DC bus-to-bus voltage is prevented.

Also in the first embodiment, the motor control system 1 includes the DC-to-DC converter 6 in order to smoothen the supply of DC power boosted and converted at the power source regeneration converter 3 to the inverter 11. Specifically, the DC-to-DC converter 6 temporarily lowers the DC power from the power source regeneration converter 3 and supplies the DC power to the inverter 11 while gradually boosting the DC power. With this configuration, assume that the output-side smoothing capacitor 41 of the inverter 11 is charged by reverse current causing the output-side DC bus-to-bus voltage to increase abnormally, and the DC-to-DC converter 6 is connected to the output-side DC bus lines 10 with the output-side DC bus-to-bus voltage increased abnormally. This may cause an inverse voltage to be applied to the DC-to-DC converter 6, causing electrical adverse effects. In light of the circumstances, the motor control system 1 according to the first embodiment includes elements, such as the contactor 13 and the contactor driver 14, to implement a configuration that directs the reverse current to the negative line N.

Also in the first embodiment, the motor control system 1 includes the contactor 13, the contactor driver 14, and the system controller 15. The contactor 13 makes or opens a short circuit between the negative line N and the output lines 8. The contactor driver 14 and the system controller 15 control operation of the contactor 13. Thus, a segmented configuration of these elements, such as the contactor 13 and the contactor driver 14, enables the contactor operation to be implemented functionally. It will be understood that the contactor driver 14 may be integral to the inverter driver 12 or that the contactor driver 14 and a portion of the system controller 15 associated with the contactor operation may be integral to the inverter driver 12.

Also in the first embodiment, the contactor 13 is a relay that includes the auxiliary contact point 51b. The auxiliary contact point 51b is caused to operate by the electromagnet 52, which is common to the auxiliary contact point 51b and the short-circuit contact points 51a. The contactor driver 14 and the system controller 15 detect an abnormality of the relay based on a connection state of the auxiliary contact point 51b at the time when the operation of the contactor 13 is controlled. This configuration makes the contactor 13 a relay robust enough to insulate itself against large amounts of driving power flowing through the output lines 8. The above configuration also ensures that in a case of an abnormality of the relay such as the contact points 51 being welded, the contactor driver 14 and associated elements detect the abnormality of the relay as a whole more readily and more reliably based on the connection state of the auxiliary contact point 51b.

Also in the first embodiment, the contactor driver 14 and associated elements short-circuit the contactor 13 while the motor 9 is approximately stationary. This configuration prevents a large amount of regeneration power caused by slowing-down rotation of the motor 9 or some other cause from flowing through the short-circuit contact points 51a of the contactor 13, and allows only a small amount of reverse current occurring after the motor has stopped to flow through the short circuit of the short-circuit contact points 51a for circumvention purposes. As a result, durability of the short-circuit contact points 51a improves. The stopping of the motor 9 may be detected directly using a detector such as an encoder or may be determined based on a control sequence of the motor control system 1 as a whole.

Also in the first embodiment, the motor control system 1 includes a detector (such as an encoder, not illustrated) to detect the speed of the motor 9. When the speed of the motor 9 is lower than the motor stationary level, the contactor driver 14 and associated elements short-circuit the contactor 13, while when the speed of the motor 9 is higher than the contactor OFF level, which is set at a level higher than the motor stationary level, the contactor driver 14 and associated elements open the contactor 13. This configuration ensures that, in consideration of the contactor 13 functioning as a "pseudo-dynamic-brake", short-circuit switching is implemented based on hysteresis properties with respect to the speed of the motor 9. This configuration, in turn, eliminates or minimizes chattering in the contactor 13 even if temporary regeneration power is caused to occur by external force or some other force after the motor 9 has stopped. It will be understood that the pseudo-dynamic-brake function of the contactor 13 is preferably used as least as possible in order to minimize tolerance current through the short-circuit contact points 51a of the contactor 13.

Also in the first embodiment, the method for activating the motor control system 1 includes: causing the contactor 13 to make a short circuit between the negative line N and the output lines 8; causing the power source regeneration converter 3 to start converting AC power from the three-phase AC power source 2 into DC power; connecting the inverter 11 to the DC-to-DC converter 6 so as to supply power to the inverter 11; and causing the contactor 13 to open the connection between the negative line N and the output lines 8. This configuration prevents inverse voltage from being applied to the DC-to-DC converter 6 when the inverter 11 is connected to the DC-to-DC converter 6. The above configuration also makes safer and smoother the start of supply of DC power from the power source regeneration converter 3 to the inverter 11.

Second Embodiment

Figure 10:
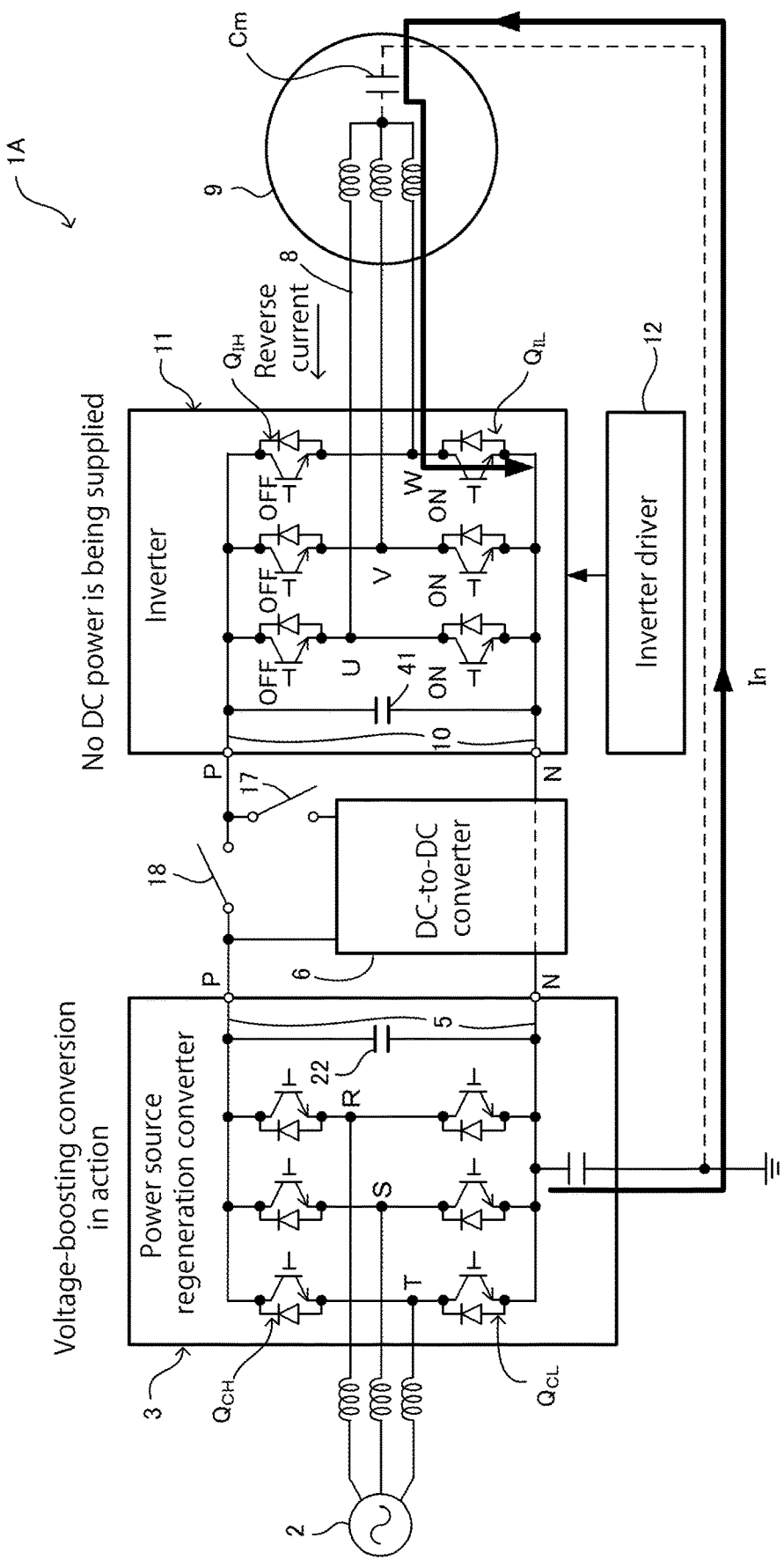
FIG. 10 illustrates an occurrence of reverse current and a path through which the reverse current flows in a second embodiment.

In the first embodiment, the contactor 13, which is located outside and separate from the inverter 11, switches between making and opening a short circuit between the negative line N and the output lines 8. This configuration, however, is not intended in a limiting sense. In a second embodiment, illustrated in FIG. 10, a circumvention path through which reverse current flowing from the motor 9 toward the inverter 11 is short-circuited to the negative line N is formed by turning on (performing ON operation of) the lower-arm switching elements $Q_{IL}$ (negative-side switching elements) of the inverter 11. In this case as well, in order to avoid a vertical short circuit between the output-side DC bus lines 10, the inverter driver 12 and the system controller 15 turn the motor 9 into OFF state (motor OFF state), completely turn off (perform OFF operation of) all the upper-arm switching elements $Q_{IH}$, and turn on (perform ON operation of) the lower-arm switching elements $Q_{IL}$ to make a short circuit.

In the second embodiment, the lower-arm switching elements $Q_{IL}$ of the output-side bridge circuit 42 of the inverter 11 are non-limiting examples of the connection switch recited in the appended claims; the inverter driver 12 and the control-related elements of the system controller 15 are non-limiting examples of the switch controller recited in the appended claims; and the lower-arm switching elements $Q_{IL}$, the inverter driver 12, and the system controller 15 are non-limiting examples of the short circuit executor recited in the appended claims.

This configuration ensures that the function to short-circuit reverse current to the negative line N is implemented by driving control performed by the inverter 11 alone, without providing a dedicated device. As a result, the system configuration as a whole is simplified and production costs of the system are reduced.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system, comprising:
   a motor having an output line;
   motor control circuitry comprising a plurality of DC bus lines and a smoothing capacitor between the DC bus lines and configured to convert DC power supplied from outside the motor control circuitry into AC power and supply the AC power to the motor as driving power; and
   short circuit circuitry configured to, while the motor control circuitry is not supplying the driving power to the motor, make a short circuit between the output line of the motor and a negative line of the DC bus lines of the motor control circuitry, wherein the short circuit circuitry comprises a connection switch, which comprises a relay including a plurality of contact points and an electromagnet common to the plurality of contact points and configured to operate the plurality of contact points, the plurality of contact points include a short-circuit contact point and an auxiliary contact point, the electromagnet is common to the short-circuit contact point and the auxiliary contact point and configured to operate the short-circuit contact point and the auxiliary contact point, and the short circuit circuitry comprises switch control circuitry configured to detect an abnormality in the relay based on a connection state of the auxiliary contact point while the switch control circuitry is controlling the connection switch.

2. The motor control system according to claim 1, further comprising:

power source regeneration conversion circuitry connected to the negative line of the DC bus lines of the motor control circuitry and configured to supply the DC power to the motor control circuitry.

3. The motor control system according to claim 2, wherein the short circuit circuitry is configured to, before the power source regeneration conversion circuitry supplies the DC power to the motor control circuitry, make the short circuit at least once in or throughout an operation period in which AC power from a commercial power source is boosted and converted into DC power.

4. The motor control system according to claim 2, further comprising:

DC-to-DC converter circuitry connected to the negative line of the DC bus lines of the motor control circuitry and configured to lower the DC power supplied from the power source regeneration conversion circuitry and supply the DC power lowered by the DC-to-DC converter circuitry to the motor control circuitry.

5. The motor control system according to claim 1, wherein the short circuit circuitry comprises the connection switch, which is configured to make or open the short circuit between the output line of the motor and the negative line of the DC bus lines.

6. The motor control system according to claim 5, wherein the connection switch is a negative-side switch of the motor control circuitry, and the switch control circuitry is configured to switch on and off the negative-side switch.

7. The motor control system according to claim 5, wherein the switch control circuitry is configured to control the connection switch to make the short circuit while the motor is substantially stationary.

8. The motor control system according to claim 5, further comprising:

detector circuitry configured to detect a motor speed of the motor, wherein when the motor speed is lower than a first speed, the switch control circuitry is configured to control the connection switch to make the short circuit, and when the motor speed is higher than a second speed higher than the first speed, the switch control circuitry is configured to control the connection switch to open the short circuit.

9. The motor control system according to claim 2, wherein the short circuit circuitry comprises the connection switch, which is configured to make or open the short circuit between the output line of the motor and the negative line of the DC bus lines.

10. The motor control system according to claim 9, wherein the connection switch is a negative-side switch of the motor control circuitry, and the switch control circuitry is configured to switch on and off the negative-side switch.

11. The motor control system according to claim 3, wherein the short circuit circuitry comprises the connection switch, which is configured to make or open the short circuit between the output line of the motor and the negative line of the DC bus lines.

12. The motor control system according to claim 11, wherein the connection switch is a negative-side switch of the motor control circuitry, and the switch control circuitry is configured to switch on and off the negative-side switch.

13. The motor control system according to claim 3, further comprising:

DC-to-DC converter circuitry connected to the negative line of the DC bus lines of the motor control circuitry and configured to lower the DC power supplied from the power source regeneration conversion circuitry and supply the DC power lowered by the DC-to-DC converter circuitry to the motor control circuitry.

14. The motor control system according to claim 4, wherein the short circuit circuitry comprises the connection switch, which is configured to make or open the short circuit between the output line of the motor and the negative line of the DC bus lines.

15. A method for activating a motor control system, comprising:

instructing a short circuit circuitry to make a short-circuit between an output line and a negative line;

instructing power source regeneration conversion circuitry to start converting AC power supplied from a commercial power source into DC power;

connecting the motor control circuitry to DC-to-DC converter to supply the DC power lowered by the DC-to-DC converter to the motor control circuitry; and instructing the short circuit circuitry to open the short circuit between the output line and the negative line, wherein the motor control system comprises a motor having the output line, the motor control circuitry comprises a plurality of DC bus lines and a smoothing capacitor between the DC bus lines and configured to convert the DC power supplied from outside the motor control circuitry into AC power and supply the AC power converted from the DC power to the motor as driving power, the short circuit circuitry is configured to, while the motor control circuitry is not supplying the driving power to the motor, make the short circuit between the output line of the motor and the negative line of the DC bus lines of the motor control circuitry, the short circuit circuitry comprises a connection switch, which comprises a relay including a plurality of contact points and an electromagnet common to the plurality of contact points and configured to operate the plurality of contact points, the plurality of contact points including a short-circuit contact point and an auxiliary contact point, the electromagnet being common to the short-circuit contact point and the auxiliary contact point and configured to operate the short-circuit contact point and the auxiliary contact point, the short circuit circuitry comprising switch control circuitry configured to detect an abnormality in the relay based on a connection state of the auxiliary contact point while the switch control circuitry is controlling the connection switch, the power source regeneration conversion circuitry is connected to the negative line of the DC bus lines of the motor control circuitry and configured to supply the DC power to the motor control circuitry, and the DC-to-DC converter is connected to the negative line of the motor to lower the DC power supplied from the power source regeneration conversion circuitry and supply the DC power lowered by the DC-to-DC converter to the motor control circuitry.

16. A motor control assistance device, comprising:

a connection switch configured to make a short circuit between an output line of a motor and a negative line of motor control circuitry that is configured to convert DC power supplied from outside the motor control circuitry into AC power and supply the AC power to the motor as driving power, wherein the connection switch is configured to make the short circuit while the motor control circuitry is not supplying the driving power to the motor, wherein the connection switch comprises a relay including a plurality of contact points and an electromagnet common to the plurality of contact points and is configured to operate the plurality of contact points, wherein the plurality of contact points include a short-circuit contact point and an auxiliary contact point, the electromagnet is common to the short-circuit contact point and the auxiliary contact point and configured to operate the short-circuit contact point and the auxiliary contact point, and wherein the connection switch comprises switch control circuitry configured to detect an abnormality in the relay based on a connection state of the auxiliary contact point while the switch control circuitry is controlling the connection switch.

* * * * *